United States Patent [19]

Downie

[11] Patent Number: 4,615,492
[45] Date of Patent: Oct. 7, 1986

[54] PULPING APPARATUS

[76] Inventor: William J. Downie, Box 47, Media, Pa. 19063

[21] Appl. No.: 627,062

[22] Filed: Jul. 2, 1984

[51] Int. Cl.⁴ ............................................. B02C 18/40
[52] U.S. Cl. ..................................... 241/46 R; 162/4;
162/261; 241/93; 241/101.2; 241/152 R;
241/277
[58] Field of Search ............... 241/42, 46 R, 46.02,
241/46.17, 83, 91, 93, 101 R, 101.2, 277, 152 R,
152 A, 154, 74, 76, 78, 79, 62, 79.3, 46.06;
162/4, 261

[56] References Cited

U.S. PATENT DOCUMENTS

| 645,422 | 3/1900 | Mellor | 162/261 |
| 1,181,967 | 5/1916 | Curtis et al. | 162/4 X |
| 2,775,168 | 12/1956 | Baxter, Jr. | 241/46 R X |
| 3,387,795 | 6/1968 | Bidwell | 162/4 X |
| 3,587,687 | 6/1971 | Hill et al. | 241/154 |
| 4,382,559 | 5/1983 | Hellberg | 241/79.3 |
| 4,509,697 | 4/1985 | Riemann et al. | 241/74 X |

FOREIGN PATENT DOCUMENTS

| 933005 | 7/1949 | Fed. Rep. of Germany | 241/46.06 |
| 706062 | 3/1954 | United Kingdom | 241/46.06 |

Primary Examiner—Howard N. Goldberg
Assistant Examiner—Joseph M. Gorski
Attorney, Agent, or Firm—George F. Mueller

[57] ABSTRACT

Pulping apparatus particularly for reducing waste fibrous material into a fiber slurry. A disintegrating and mulching drum is provided to shred and tear wet feed material into clumps of wet fibrous material and the clumps then converted into water-logged masses of wet fibers. A dispersing drum then converts the water-logged masses of fibers into a fiber slurry.

9 Claims, 8 Drawing Figures

PULPING APPARATUS

This invention relates to pulping apparatus and more particularly to means for processing waste fibrous materials of all types, such as, for example, fibrous sheet material in the form of paper, pulp board, and cardboard, whereby the fibrous constituents may be recovered for subsequent reuse or discharged to a sewer system.

The present invention provides a simple efficient device for shredding fibrous materials such as waste paper and cardboard and converting the shredded material into a fibrous slurry.

The present invention provides apparatus of such design whereby it may be adapted readily for the handling of any desired volume and type of fibrous materials.

The invention provides a novel means for mulching and disintegrating the fibrous material into clumps and reduces readily the clumps into a fibrous slurry of the constituent fibers.

The apparatus of the present invention in brief, includes a novel rotatable drum immersed in water adapted to shred or tear the wet stock into clumps, mulching the clumps in the water to form small bulky masses of wet fibers and passing the wet mulched clumps to a second drum which converts the wet mulched clumps into a fibrous slurry.

In the drawings illustrative of a preferred design:

Figure 1:
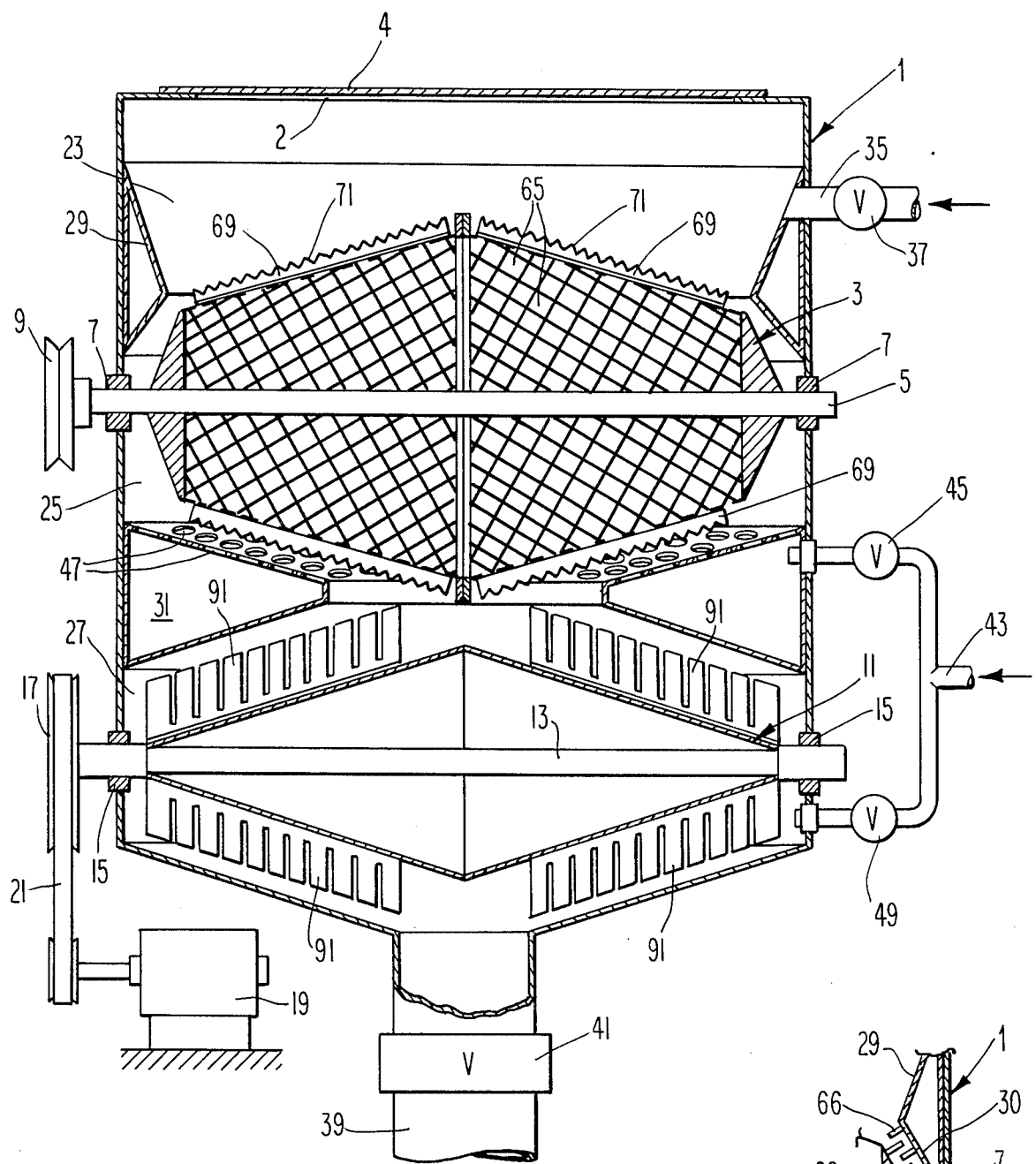
FIG. 1 is an elevational view, partly in section, of the apparatus, of the present invention.

Referring to the drawings illustrating a preferred structure, the rotatable drums are mounted within a suitable tank 1 which may be cylindrical or rectangular in cross section and is open at it's upper end as at 2. A removable cover or lid 4 is provided as a closure. The means for disintegrating or shredding of the wet stock into clumps comprises a rotatable drum 3 which is disposed on shaft 5 journaled in suitable bearings 7 mounted in the walls of tank 1. The shaft 5 is provided with a pulley 9 mounted on the shaft externally of the tank. The pulley is driven by a motor (not shown). Means for converting the mulched clumps into a fibrous slurry comprises a dispersing drum 11 disposed beneath shredding drum 3. The dispersing drum 11 is mounted on a shaft 13 journaled in suitable bearings 15 mounted in the side walls of tank 1. The shaft 13 is provided with a pulley 17 externally of the tank and is driven by a motor 19. The pulleys 9 and 17 may be driven by either a belt or chain, a belt 21 is shown as the drive means between motor 19 and pulley 17. Preferably, independent motors are provided as the driving means, the disintegrating or shredding drum 3 being operated at a relatively slow speed while the dispersing drum 11 being operated at a relatively high speed.

The tank 1 is divided into an upper compartment 23, an intermediate compartment 25 and a lower compartment 27 by suitable baffles 29 and 31. Water is suppled to the tank through pipeline 35 the supply being regulated by valve 37. The water is maintained at a level above the shredding drum 3, preferably at a level of at least that of the pipeline 35. The open top of the tank 1 may be closed by a removable cover 2 when the apparatus is not in operation. The final fiber slurry is discharged from the bottom of tank 1 through pipeline 39 and valve 41.

At the termination of the shredding operation, but while continuing the operation of the dispersing drum 11 and valve 41 is opened to allow the level of the water in tank 1 to drop into lower compartment 27. Any shredded or mulched material remaining in the intermediate compartment 25 is flushed into the lower compartment 27 by water supplied through pipeline 43 and valve 45 to the interior of baffle 31 having a series of apertures 47. Water exiting through apertures 47 and remaining mulched material falls into contact with dispersing drum 11 where the mulched material is converted into a fibrous slurry. Upon completion of the fiber dispersing operation the slurry is drained by opening valve 41. Material which may adhere to drum 11 and the bottom of the tank is flushed by water supplied by pipeline 43 through valve 49.

Figure 2:
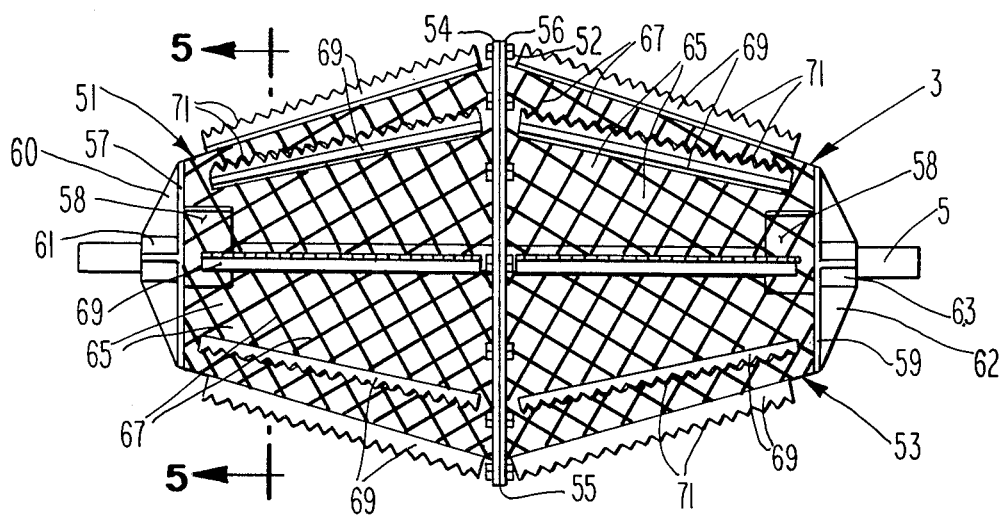
FIG. 2 is an elevational view of the shredding-mulching drum.

As illustrated in FIG. 2, the disintegrating or shredding drum 3 is formed of a pair of frusto-conical elements 51 and 53, the bases of which are secured together as at 55. The bases may be joined as by welding or preferably are provided with outwardly extending flanges 54 and 56 which are joined by suitable bolts 52. The opposite ends of frusto-conical elements 51 and 53 are closed as by means of end plates 57 and 59 respectively, having integral hubs 61 and 63 and integral ribs 60 and 62, respectively. The drum is secured to shaft 5 by conventional means such as pins (not shown) extending through the hubs 61 and 63 and the shaft 5 or set screws (not shown) in the hubs.

The frusto-conical elements 51 and 53 of the drum are formed of sheet metal, the gauge of the metal being dictated by the type of unit; domestic, commerical, industrial, etc. The apertures 65 in the sheet metal should be of such size as to allow at least some of the shredded fragments to pass into the interior of the drum. A satisfactory type of commercial material for the production of the elements is conventional metal mesh grating having rectangular or diamond-shaped apertures defined between ribs 67 of the sheet material commonly used in factory stairs and above ground walkways similar in structure to expanded metal lathe. A further structural materials satisfactory for the elements in sheet metal having upstanding ears represented by the common household vegetable shredder.

Figure 4:
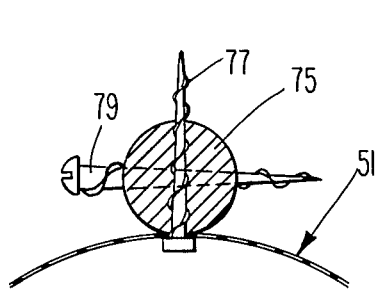
FIG. 4 is an end view of a portion of the drum illustrating a further type of disintegrating means secured to the surface of the drum of FIG. 2.
Figure 3:
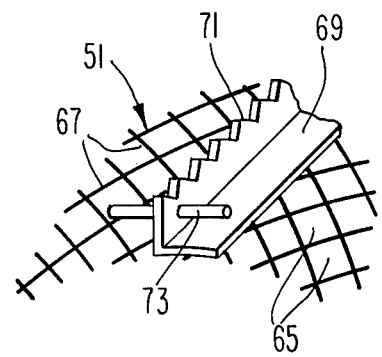
FIG. 3 is a partial view of the surface of the drum illustrating a disintegrating rib secured to the surface of the drum of FIG. 2.

Although these forms of sheet metal, when bent into the conical configuration present spurs, ears or toothlike projections along the external surface of the conical elements which will effect a tearing and shredding of the fibrous stock, external ribs 69 are secured to the frusto-conical elements so as to more rapidly shred the stock. The ribs may be formed of a variety of specific structures. As illustrated in FIG. 3, the ribs may be in the form of a metal angle 69 preferably having the extending leg 71 serrated. In order to further increase the tearing ability of the rib, pins 73 (only one shown) may be secured to the extending leg. A further modification of the ribs is shown in FIG. 4 where the ribs are formed of a tubular member 75 secured to the frusto-conical element 51. The tube may be secured to the element 51 by means of a screw 77 preferably having a point end and extends through element 51 and tube 75. So as to further increase the tearing action of the rib a point pin or screw 79 extends horizontally through the tube.

Figure 5:
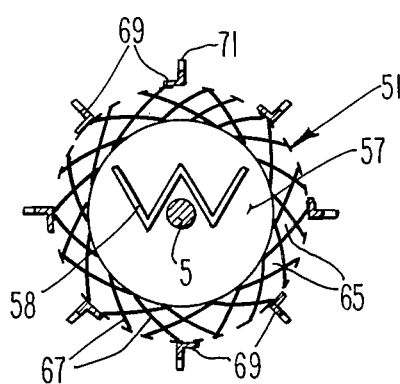
FIG. 5 is a sectional view taken on line 5—5 of the drum of FIG. 2.

In order to further disintegrate material and fiber clumps which pass into the interior of the shredding drum 3, agitator plates 58 are provided within the shredding drum. As shown in FIG. 5 a "W" shaped agitator plate is mounted on the interior surface of end plate 57. A like "W" shaped agitator plate 58 is mounted on the interior surface of end plate 59. During operation, the agitator plates create sufficient turbulence of the water interior of the drum to cause a continuous circulation of the fragments and fiber clumps and cause them to contact the interior surface of the drum and effect a reduction in the size of the fragments and clumps. The turbulence created also aids in forcing the water-logged fiber clumps through apertures in the drum surface.

Figure 1A:
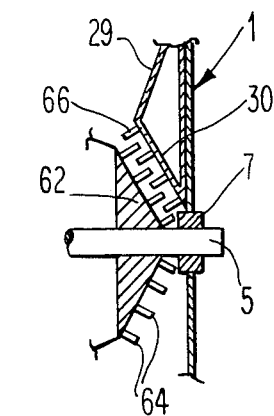
FIG. 1A is a partial sectional view illustrating a preferred modification of the end plates of the shredding-mulching drum.

So as to prevent a clogging by feed material of the space between the ends of drum 3 and the bearings 7 in intermediate compartment 25, cooperating pins 64 are mounted on ribs 62 of end plate 59 and pins 66 are disposed on the depending skirt 30 of the upper baffle as shown in FIG. 1A. Similarly, pins are mounted on ribs 60 of end plate 57 and on the depending skirt of the upper baffle adjacent the opposite end of drum 3. Feed material torn by drum 3 which passes down over the ends of the drum will be carried by the pins 64 on the ribs and will be disintegrated as the material passes the pins 66. The material is thereby unable to build up and clog at the bearing areas.

Figure 6:
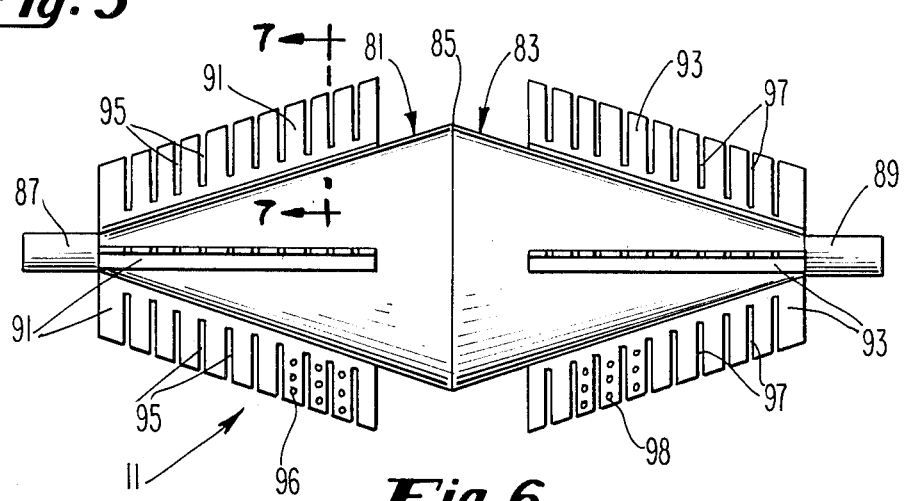
FIG. 6 is an elevational view of the drum adapted to form the fibrous slurry.

As shown in FIG. 6 the dispersing drum 11 is formed of the two frusto-conical elements 81 and 83, the bases of which are secured together as at 85. The bases may be joined as by welding or the bases may be provided with outwardly extending flanges and joined by suitable bolts as shown in FIG. 1 for the elements of the disintegrating drum. The opposite ends of the elements 81 and 83 are provided with hubs 87 and 89. The drum is disposed on shaft 13 and fixed to the shaft by conventional means, such as pins extending through the hubs and shaft or set screws in the hubs.

Figure 7:
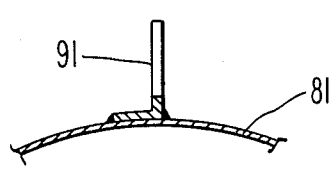
FIG. 7 is a sectional view taken on line 7—7 of FIG. 6.

In order to disintegrate the bulky water-logged fibrous clumps which are created by the shredding drum the dispersing drum 11 is provided with a plurality of radially extending ribs 91 and 93 as illustrated in FIGS. 6 and 7. Conventionally, the ribs may be formed of metal angle material, as shown in FIG. 7 and secured to the drum as by welding. The extending legs of the metal angles are provided with a series of spaced slots 95 and 97. The legs may also be provided with perforations 96 and 98 if desired. Alternatively, only slots may be provided or only perforations may be provided. As the water-logged clumps contact the ribs, the masses are forced to pass through the slots and/or perforations thereby separated into smaller fragments producing a fiber slurry.

In operation the tank 1 is filled with water and the fibrous stock material such as waste paper, for example, is added at the top of the tank above baffle 29 and shredding drum 3. After the stock has become water-soaked, the shredding drum is activated whereby the stock becomes torn and shredded into fragments. As rotation of drum 3 is continued, the fragments become mulched and some of the fragments pass into the interior of the drum. The turbulence inside the drum forces the fragments into contact with the internal surface causing a further disintegration of the clumps and forces the smaller clumps through the apertures 65. During this operation the clumps become highly water-logged masses of wet fibers.

The water-logged masses pass from the intermediate compartment 25 into the lower compartment 27. Upon contact with the dispersing drum 11 which is rotating at a high speed, the masses are forced through the slots 95 and 97 and/or the perforations 96 and 98 to form a fiber slurry. Upon completion of the operation, valve 41 is opened and the fiber slurry discharged to any desired further processing equipment or into the sewer. Opening of valves 45 and 49 in pipeline 43 will flush any remaining fibrous material from the apparatus.

It is obvious that the operation may be conducted in a continuous manner. In such operation, the tank is filled with water and the shredding-mulching drum 3 and the dispersing drum 11 are activated. Water is supplied continuously to the tank through pipeline 35, the amount of water being regulated by valve 37. A small amount of water is also supplied continuously to baffle 31 through pipeline 43 and valve 45. Similarly, a small amount of water is supplied to the bottom of the tank through valve 49. Fibrous feed stock material, such as, for example, waste newspspers, is added continuously at the top of tank 1. Discharge valve 41 is opened to allow a constant discharge of the fibrous slurry, the discharge being based upon the amount of water and feed material supplied to the tank.

The feed material is torn and shredded into fragments by drum 3. Some of the fragments pass into the interior of the drum. Continued rotation of the drum causes a disintegration and mulching of the fragments which come into contact with the external surface of the drum and the ribs 69 on the drum. Fragments which pass into the interior of the drum become disintegrated and mulched as they are caused to contact the interior surface of the drum due to the turbulence created by the agitator plates 58. The disintegration and mulching of the clamps of feed materials converts the clumps into highly water-logged masses of wet fibers which gradually pass to the bottom of compartment 25 and into compartment 27. Sufficient water is supplied to baffle 31 so that the water issuing through apertures 47 flush water-logged masses which may settle on the baffle into compartment 27.

The water-logged masses of wet fibers come into contact with the radially extending ribs 91 and 93 on the rapidly rotating dispersing drum 81 in compartment 27. The water-logged masses are forced through the slots and/or apertures in the ribs and separate the fibers in the masses to form a fiber slurry. The slurry exits the tank through pipeline 39, the volume of the slurry being regulated by valve 41. Fibers which may settle on the bottom of the tank are flushed from the tank by water supplied through valve 49.

It is common in producing non-woven water-laid webs from fiber slurries that the slurry contain from about 0.1 to 5% by weight of fibers. In forming slurries of fibers with the present apparatus for use in recycling paper, the consistency or fiber content of the slurry may be regulated by the amount of water supplied to baffle 31.

It is obvious that the drawings have been simplified for purposes of illustration. For example, because the structure of sheet material mesh grating and the common household shredder or grater is well known, drum 3 has been illustrated diagrammatically in the drawings. As is apparent; the various ribs secured to the drums project radially from the surfaces of the drum and extend longitudinally of the drums. The description and the drawings are representative of a preferred apparatus for general application.

In the case of a small domestic type unit intended for use in a home where the waste material consists primarily of newspapers, paper toweling, paper napkins, wrapping paper, paper bags and the like, the apparatus need only include the disintegrating and mulching drum. For such unit, it is obvious that the tank need consist only of an upper compartment and a lower compartment thus eliminating the lower baffle 31, the piping and valve 45 and the dispersing drum 11. In operation, the motor for driving the drum 3 should be a multispeed motor. During the initial disintegrating and shredding operation, the drum is driven at a slow speed. After the feed material has been shredded and mulched into water-logged masses of wet fibers, the drum is then driven at a high speed whereby the water-logged masses become disintegrated to form a fiber slurry.

What is claimed is:

1. Waste paper pulping apparatus comprising: a tank open at its upper end and closed at its bottom end; a pair of spaced baffles within the tank that divide the tank into an upper compartment, a lower compartment, and an intermediate compartment between the upper and lower compartments; means for supplying water into the upper compartment; a rotatable disintegrating and mulching drum disposed within the intermediate compartment and extending partially into the upper compartment, the disintegrating and mulching drum comprising sheet metal having apertures therein, ribs secured to the sheet metal and extending outwardly from the sheet metal, and outwardly projecting spurs on the ribs; a rotatable dispersing drum disposed within the lower compartment, the dispersing drum comprising a pair of frusto-conical members joined to each other at their bases, a hub secured to each end opposite each base of each frusto-conical member and supporting its respective frusto-conical member on a rotatable shaft a plurality of ribs having slots therein and being secured, in spaced radial relationship with respect to each other, to and projecting radially outwardly from surfaces of the frusto-conical members, said ribs extending longitudinally along the frusto-conical members, and means for discharging a fibrous slurry from the bottom end of the tank.

2. Waste paper pulping apparatus as defined in claim 1 wherein the disintegrating and mulching drum comprises sheet metal mesh grating including ribs and having rectangular apertures between the ribs.

3. Waste paper pulping apparatus as defined in claim 2 wherein the disintegrating and mulching drum comprises a pair of frusto-conical members of sheet metal grating including ribs and having rectangular apertures between the ribs, the frusto-conical members being joined to each other at their bases, end plates closing ends of the frusto-conical members opposite their bases and supporting the frusto-conical members on a rotatable shaft, and a W-shaped agitator plate secured to a surface of each of the end plates and extending within the frusto-conical members.

4. Waste paper pulping apparatus as defined in claim 3 wherein the ribs consist of metal angle elements, each of the elements has a base leg and a projecting leg, each base leg is secured to and projects radially outwardly from a surface of one of the frusto-conical members, and each projecting leg is serrated.

5. Waste paper pulping apparatus as defined in claim 4 wherein a plurality of pins are secured to and project from the projecting legs of the metal angle elements.

6. Waste paper pulping apparatus as defined in claim 3 wherein the ribs consist of tubular elements, a plurality of screws having pointed ends secure the tubular elements to surfaces of the frusto-conical members, and extend through the tubular members.

7. Waste paper pulping apparatus as defined in claim 1 wherein the ribs secured to the frusto-conical members of the dispersing drum consist of metal angle elements, each element includes a base leg and a projecting leg, each base leg is secured to and projects radially outwardly from a surface of one of the frusto-conical members, and each projecting leg has slots therein.

8. Waste paper pulping apparatus as defined in claim 3 wherein the disintegrating and mulching drum comprises; a first pair of frusto-conical members consisting of sheet metal mesh grating including ribs and having rectangular apertures between the ribs, the frusto-conical members being joined to each other at their bases, an end plate closing each end of each frusto-conical members opposite each base and supporting its respective frusto-conical member on a rotatable shaft, a plurality of metal angle elements, each element having a base leg and a projecting leg, each base leg being secured in radially spaced relationship to one of the frusto-conical members, each projecting leg being serrated; and the dispersing drum comprises a second pair of frusto-conical members joined to each other at their bases, a hub secured to each end of each frusto-conicl member of the second pair of the frusto-conical members opposite each base and supporting its respective frusto-conical member on a rotatable shaft, and a plurality of metal angle elements, each element having a base leg and a projecting leg, each base leg being secured in radially spaced relationship to a surface of one of the second pair of frusto-conical members, and each projecting leg having slots therein.

9. Waste paper pulping apparatus as defined in claim 8 wherein a W-shaped agitator plate is secured to a surface of each of the end plates and extends within the first pair of frusto-conical members.

* * * * *